C. HOWELL.
Finger for Harvesters.
No. 21,499.
2 Sheets—Sheet 1.
Patented Sept. 14, 1858.
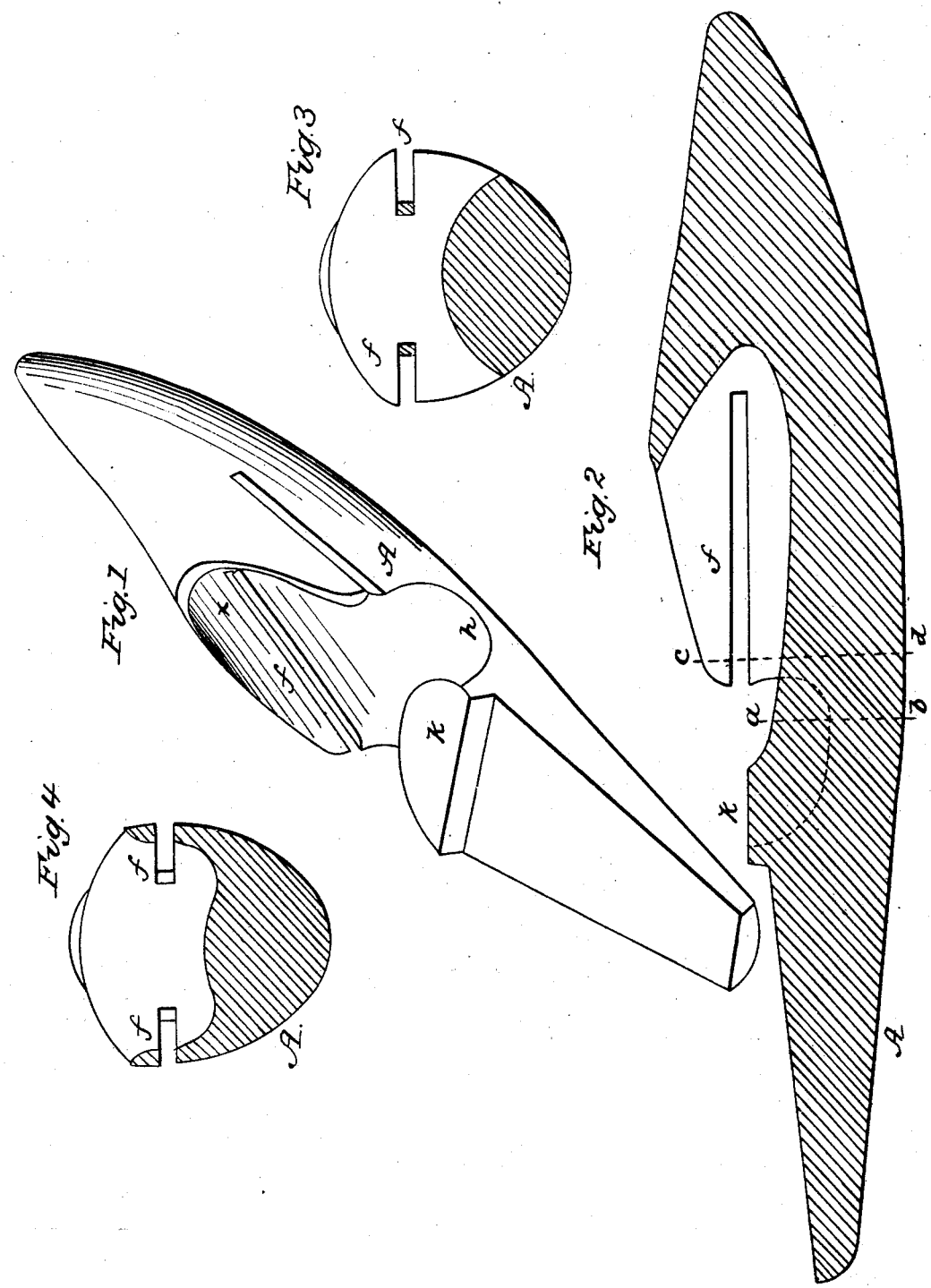

C. HOWELL.
Finger for Harvesters.
No. 21,499.
2 Sheets—Sheet 2.
Patented Sept. 14, 1858.
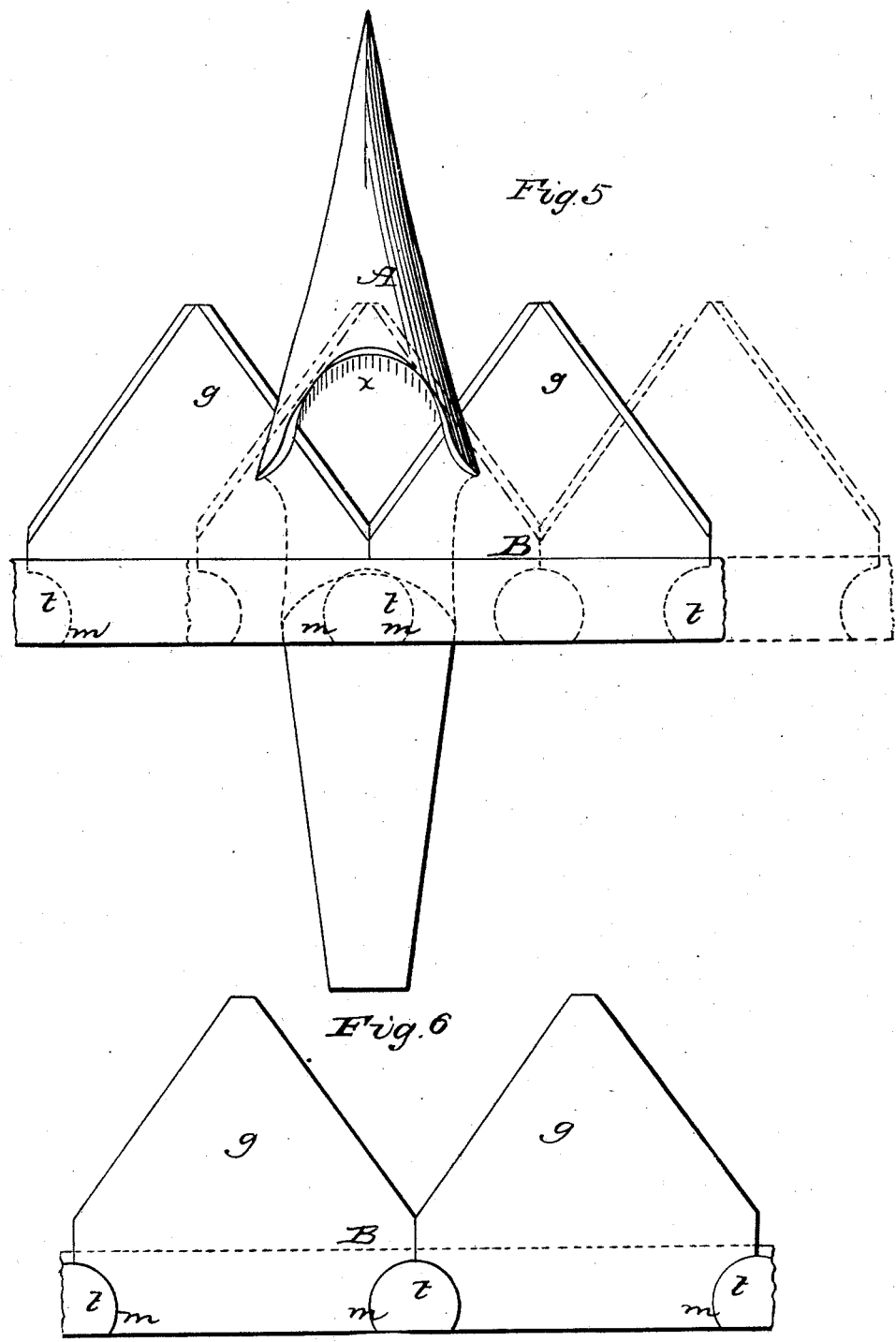

UNITED STATES PATENT OFFICE.

CHARLES HOWELL, OF CLEVELAND, OHIO.

IMPROVEMENT IN CUTTING APPARATUS FOR HARVESTERS.

Specification forming part of Letters Patent No. 21,499, dated September 14, 1858.

*To all whom it may concern:*

Be it known that I, CHARLES HOWELL, of Cleveland, in the county of Cuyahoga and State of Ohio, have invented a certain new and useful Improvement in the Cutting Apparatus of Reaping and Mowing Machines, of which the following is a full, clear, and exact description, reference being had to the accompanying drawings, in which—

Figure 1 represents a view in perspective of my guard-finger; Fig. 2, a longitudinal vertical section of the same; Fig. 3, a transverse vertical section taken through the line $a\,b$ of Fig. 2; Fig. 4, a similar section taken through the line $c\,d$; Fig. 5, a plan of a guard-finger and a portion of the knife when properly adjusted to each other, and Fig. 6 a plan of the knife.

My present improvement relates to the cutting apparatus of reaping and mowing-machines; and it consists in so forming and constructing its constituent parts and arranging them in relation to each other as to greatly facilitate the operation of cutting when working in tangled grain or grass, and also to prevent in the most effectual manner the lodgment and deposition of such fibrous substances as would impede or prevent the free and easy play of the knife over the fingers.

The improvement by means of which these desiderata are carried into effect consists, first, in a novel construction of the guard-fingers, and, secondly, in a new mode of constructing and arranging the sections of the knife upon the sickle-bar when intended to be used with a finger constructed on my plan or on one substantially the same.

To enable others skilled in the art to make, construct, and use my improvement, I will now proceed to describe it in detail, omitting the description of such parts as are not essential to the full understanding of my present improvement.

In the accompanying drawings the finger A is represented as being formed in one piece of cast steel or iron or other suitable material properly tempered, case-hardened, or chilled, for the purpose of making a cutting-edge for the knife to play over, for which purpose the whole is made of sufficient size and thickness to yield the necessary strength and rigidity, and of a shape resembling a spear-head, broad at the middle, tapering off toward the rear and running down to a point at the front end, and an edge on its upper and under sides, which, diverging as they recede from the point, present the best form possible for a finger for clearing itself in tangled or matted grain or grass. At the sides of the fingers the usual slots, $f$, are formed, between the sides of which the blades of the knife play. The edges of these slots are filed smoothly and evenly down, so as to form a cutting-edge or stationary knife, which, in conjunction with the blades or sections $g$ of the traversing-knife B, serve effectually to sever such grain or grass as may be forced between the fingers by the advance of the machine; but were the whole under side of the slot solid or in the same plane with the edges, the effect would be that it would become gummed and choked up by the vegetable matter exuding from the grain being cut, and by the introduction of the straw of the grain and other fibrous substances by the motion of the knife, to prevent which that part of the finger lying between the lower edges of the slot is formed concave or hollow, a sufficient bearing for the support of the knife being left around its edge, so that as the knife operates any foreign matter which may find entrance between the knife and slot edge will be deposited in the concavity, whence it escapes through an opening, $h$, formed on both sides of the finger for this purpose, this opening being arranged slightly in advance of the finger-bar, instead of being at its rear, which speedily becomes choked up and therefore practically inoperative. The concavity and opening thus formed presents the general form of the frog of a horse's foot. The upper side of the slot is also formed concave, a sufficient space, $x$, being cut out at its rear end to allow such substances as may work in between the slot and knife to escape at the rear; but as the choking and clogging up of the knife are not confined alone to the cutting or front part of the knife, but extend equally to the rear, that part $k$ of the finger at the rear upon which the knife rests and plays over is so constructed as that the openings J (and which are of peculiar shape) in the rear part of the knife shall clear it of all obstructions at every stroke, for which purpose the rest $k$ has its front side formed in the shape of a D, or segment of a circle, or nearly so, having the circular part in front, so that as the openings $k$ formed in the rear of the blades of the knife (and which are also of circular shape, but open at the rear, a portion of the circle, as it were, being cut off) traverses over it in either direction they will effectually clear the whole of it of any substances that may work in between it and the knife, to which end the hooked ends $m$, formed by the cutting off of a portion of the circle, very materially assist, they acting as clearing-hooks, from all of which it will be apparent that as the diameter of the clearing-circles exceed the length of the perpendicular raised from the center of the cord to the arc of the segment which forms the rest $k$, and as the stroke of the knife exceeds in length the width of the fingers they must necessarily clear them of any and all obstructions that may interpose themselves between the knife and segment. The finger may, if thought advisable, be made of wrought-iron, in which event the cap in front had better be made separate from the main part of the finger, and afterward riveted or otherwise properly secured to it. The curved rest $k$ may also be made triangular, if desired, and the same results be produced, or a triangular opening may be formed on the rear of the knife, instead of curved ones, in which event the apex of the triangle will be at the rear end of the knife and open like the other—that is to say, cut off—leaving the ends of the two sides which extend to the rear of the sections to act as clearing-hooks.

Having thus described my invention, and disclaiming the construction of guard-fingers as patented to Cyril Wagner June 24, 1856, what I claim as new, and desire to secure by Letters Patent, is—

1. A finger formed with a frog-shaped concavity on the under side of the knife, having outlets on its sides in front of the finger-bar, in the manner and for the purposes set forth.

2. A sickle or knife having a series of curved openings, J, or their equivalents, formed on its rear and under side, when used in connection with guard-fingers, provided with a D-shaped rest, $k$, or its equivalent, the whole being arranged, constructed, and operated in relation to each other in the manner and for the purposes substantially as set forth.

In testimony whereof I hereunto set my hand.

CHARLES HOWELL.

Witnesses:
DAVID B. SALMER,
WM. H. FARGO.